United States Patent [19]

Pefley et al.

[11] Patent Number: 4,651,682
[45] Date of Patent: Mar. 24, 1987

[54] LIQUID FUEL SYSTEM METHOD AND APPARATUS

[75] Inventors: Richard K. Pefley; James B. Pullman, both of Santa Clara, Calif.

[73] Assignee: Prodatek Corporation, Sunnyvale, Calif.

[21] Appl. No.: 711,086

[22] Filed: Mar. 12, 1985

Related U.S. Application Data

[62] Division of Ser. No. 345,256, Feb. 2, 1982, Pat. No. 4,503,832.

[30] Foreign Application Priority Data

Aug. 3, 1981 [IT] Italy .............................. 23327 A/81
Aug. 3, 1981 [MX] Mexico ........................... 188587

[51] Int. Cl.$^4$ .............................................. F02B 75/12
[52] U.S. Cl. ...................................... 123/1 A; 123/327
[58] Field of Search ................... 123/1 A, 527, 27 GE

[56] References Cited

U.S. PATENT DOCUMENTS

| | | | |
|---|---|---|---|
| 2,443,120 | 6/1948 | Saucier | 123/521 |
| 2,767,691 | 10/1956 | Mengelkamp et al. | 123/1 A |
| 2,817,324 | 12/1957 | Sievers | 123/527 |
| 2,872,911 | 2/1956 | Botto | 123/527 |
| 3,443,551 | 5/1969 | Laubach | 123/27 GE |

FOREIGN PATENT DOCUMENTS

WO81/00282 2/1981 PCT Int'l Appl. ............. 123/472

Primary Examiner—E. Rollins Cross
Attorney, Agent, or Firm—Limbach, Limbach & Sutton

[57] ABSTRACT

A system is described for improving performance of spark ignition, internal combustion engines using fuels such as liquified petroleum gas (LP-gas), which have conventionally been stored as a liquid and delivered to the engine as a vapor. This system stores such fuels as liquids (10) and delivers the fuel to the engine inlet air stream as a liquid. The absorption of heat by the vaporizing fuel lowers engine inlet air temperature, increasing its density and permitting more fuel to be burned in each cycle. Vaporizing heat in a pilot line (17) provides the cooling to the liquid fuel in the main fuel line (20) and provides fuel to maintain the engine idling. A member (27) slides within a fuel delivery chamber (25) for covering or uncovering a series of orifices (26) through which the liquid fuel passes into the inlet air stream of the engine.

3 Claims, 9 Drawing Figures

$$P = 2.741 \cdot 10^{-17} \times T^{6.866} - 14.48$$
P    psia
T    °R

LIQUID FUEL SYSTEM METHOD AND APPARATUS

This is a division of application Ser. No. 345,256, filed Feb. 2, 1982, now U.S. Pat. No. 4,503,832.

1. Technical Field

The invention relates to the field of fuel delivery to engines.

2. Background Art

Internal combustion engines have been run at one time or another, on nearly every conceivable fluid fuel. Fluid is used here to describe both liquid and gaseous fuel. The principal fuels in current and past practice are in the liquid, vapor or gaseous phase at normal environmental temperatures and within the normal commercial transportation pressure limits (1 to 200 atmospheres). Fuels of commercial significance fall conveniently into three categories with respect to the locations of their phase transitions. They are so labeled and described as follows:

1. Liquid Fuel. Liquid at atmospheric pressure and normal climatic temperatures (−40°F. to 120°F.). Examples are gasoline, diesel fuel and alcohol.
2. Vapor Fuel. Vapor at atmospheric pressure and normal climatic temperatures (−40°F. to 120°F.) but liquid under elevated (2 to 200 atmospheres) pressures. Generally this corresponds to a critical temperature in excess of 100° F. Critical temperature is the highest temperature at which a vapor can be condensed by isothermal compression. Examples are gas, (propane, butane, etc.).
3. Gas Fuel. Gas at atmospheric and elevated pressures, and normal climatic temperatures. Generally this corresponds to a critical temperature less than −40° F. Examples are hydrogen, methane, natural gas, etc.

Fuels that remain liquid throughout normal ambient conditions (Type 1above) are stored and delivered as liquids. Gaseous fuels (Type 3), which cannot be liquified by pressure alone at normal ambient temperatures are stored and delivered as gases. Vapors (Type 2) which may be liquified by high pressures, at ambient temperatures, are generally stored as liquids and delivered as vapors.

Internal combustion engines initiate fuel burning within the cylinder in two general ways and are classified accordingly.

1. "Compression ignition" in which the energy of compression is such that the resultant air temperatures initiate combustion. Compression ratios in excess of 16 are common and primary fuel is injected directly into the cylinder or prechamber in order to control burning.
2. "Spark ignition" in which an electrical spark is used to start fuel burning. Fuel is generally delivered to the inlet air stream, as a liquid and partially vaporizes en route to the cylinder.

Compression ignition engines may use supplementary equipment, such as glow plugs, for start-up (when the engine is cold) but they remain compression ignition engines.

Table I summarizes past practice with respect to the types of fuel storage and delivery systems and engine types with which they are used. In no known previous patents involving a vapor fuel (Type 2) has the fuel been delivered in liquid phase to the air stream of a spark ignited engine. For compression ignition engines, vapor fuels have been used only as supplementary fuels and have generally been introduced into the air stream as a vapor.

TABLE I

| | | PAST PRACTICE IN USE OF VARIOUS FUELS IN I.C. ENGINES | | | | | |
|---|---|---|---|---|---|---|---|
| | | FUEL Storage Phase | | Delivery Phase | | ENGINE IGNITION | |
| | Type | Liquid | Vapor | Liquid | Vapor | Compression | Spark |
| 1. | Liquid Fuel. Examples- Gasoline Diesel, Alcohol, etc. | X | | X | | X | X |
| 2. | Vapor Fuel. Examples- propane, butane, etc. | X | | | X | $X_{1\&2}$ | |
| | | | | | $X_1$ | | X |
| 3. | Gas Fuel. Examples- Hydrogen, methane, CNG, etc. | | X | | X | X | X |

$X_1$ = Supplementary Fuel only
$X_2$ = U.S. Pat. No. 2,767,691

In Table I it is evident from the blank spaces that Type 2 vapor fuels are delivered almost exclusively as vapors rather than liquid. General past practice with Type 2 vapor (fuels that can change phase at ambient temperature with pressure changes) is to store as a liquid and deliver as a vapor. In fact, to insure vaporization, most such systems have a separate vaporizer which uses either exhaust gases or engine coolant to add heat to the fuel. Vapor is then introduced into the inlet air stream of the engine at some convenient point. As a rule, the fuel is beginning to vaporize in varying degrees from the tank on downstream to the vaporizer, after which it is required to be 100% vapor.

On spark ignition engines there is no known prior practice of liquid fuel delivery for Type 2 fuel. On compression ignition engines, liquid delivery of vapor fuels was used only as a supplement to normal diesel fuel. In this latter case, the Type 2 fuel was injected into the cylinder at the beginning of compression. In this arrangement the vaporization heat of the fuel reduces compression work, but does not improve air mass charging density. In U.S. Pat. No. 2,767,691 to Mengelkamp et al., vapor (Type 2) fuels are injected in liquid phase into a compression ignition engine after cylinder filling and as a supplementary fuel only. Mengelkamp et al. suggest that liquid delivery of vapor (Type 2) fuel, requires one of two approaches to maintaining the fuel in liquid phase: (1) increased external pressure or, (2) external cooling. In the first approach an external gas supply was used to build up pressure in the vapor fuel tank and thus drive the liquid further into the subcooling region. The second approach by heat removal involved external heat exchange such as with a cool water supply system.

Vapor (Type 2) fuels are delivered primarily in vapor form and the metering devices used to modulate this flow come in every conceivable shape and configuration. Among the metering devices are those disclosed in U.S. Pat. Nos. 2,443,120 to Saucier and 3,443,551 to Laubach based upon a piston uncovering successively more flow passages as it is moved axially. A variation in U.S. Pat. No. 2,817,324 to Sievers is two concentric tubes with apertures which may be matched in varying degrees, thereby varying the flow restriction and hence the flow. In Mengelkamp, et al., U.S. Pat. No. 2,767,691 the fuel was metered into the compression ignition engine by an additional injection pump.

DISCLOSURE OF INVENTION

Broadly stated, the present invention, to be described in greater detail below, is directed to a liquid fuel system method and apparatus for injecting vapor fuel under pressure in liquid phase directly into the inlet air stream of a spark ignition engine utilizing vaporization of a small portion of the fuel to cool the remainder of the fuel to insure injection of a liquid.

One feature and advantage of the present invention is that the heat required to vaporize the fuel is absorbed from the inlet air stream thereby lowering its temperature and increasing its density. Since the air density is greater, each charge has a greater weight of air. For any consistent stoichiometry a greater weight of fuel results and therefore greater power output for a given engine speed. Also, since the combustion temperatures are lower there will be lower exhaust emission in the category, oxides of nitrogen.

In accordance with another aspect of the present invention a pilot fuel line is provided for directing fuel initially in liquid phase but throttled to a reduced pressure into heat exchange with the main fuel line so that vaporizing fuel in the pilot fuel line cools fuel in liquid phase in the main fuel line thereby preventing vaporization. In a preferred embodiment of this aspect of the invention the pilot fuel line is located within, typically concentrically within, the main fuel line.

In accordance with the latter aspect of the present invention vaporization of a small portion of the vapor fuel in liquid phase is utilized to cool the remainder of the fuel in liquid phase and the vaporized fuel is utilized to operate the engine in idling condition.

In accordance with another aspect of the present invention a fuel system is provided including a fuel delivery adapter for securing in place along the inlet air stream of an engine and having a fuel delivery chamber with a series of liquid phase flow orifices connecting the chamber to the inlet air stream of the engine and a slidable member within the delivery chamber for progressively uncovering the series of orifices with actuator means for moving the member to cover or uncover the flow orifices for passage of fuel therethrough in response to engine fuel needs.

One feature and advantage of the latter aspect of the present invention is a uniformly controllable introduction of the desired amount of liquid fuel directly into the inlet air stream of the engine.

Another feature and advantage of the present invention is the provision of a liquid fuel system which can be directly assembled onto an existing spark injection engine for operation of that engine more efficiently with vapor fuel delivered to the engine in liquid phase than the conventional gasoline fuel with which the engine was initially designed to operate.

In accordance with still another aspect of the present invention the orifices have a diameter in the range of 0.002 to 0.006 inches. Smaller holes offer excessive pressure drop and larger holes allow fuel to pass in large droplets which do not vaporize readily enough.

In accordance with another aspect of the present invention the axes of at least certain of the orifices are arranged non-parallel with the axes of other orifices to provide fuel atomization in a very short distance into the air stream for thorough mixing of fuel and air.

Other features and advantages of the present invention will become more apparent upon a perusal of the following specification taken in conjunction with the accompanying drawings wherein similar characters of reference refer to similar structural elements in each of the several views.

BEST MODE FOR CARRYING OUT THE INVENTION

The preferred embodiment of the present invention is a liquid fuel system for LP-gas maintained under pressure in liquid phase with liquid and vapor in equilibrium for direct attachment onto a spark ignition engine.

Figure 1:
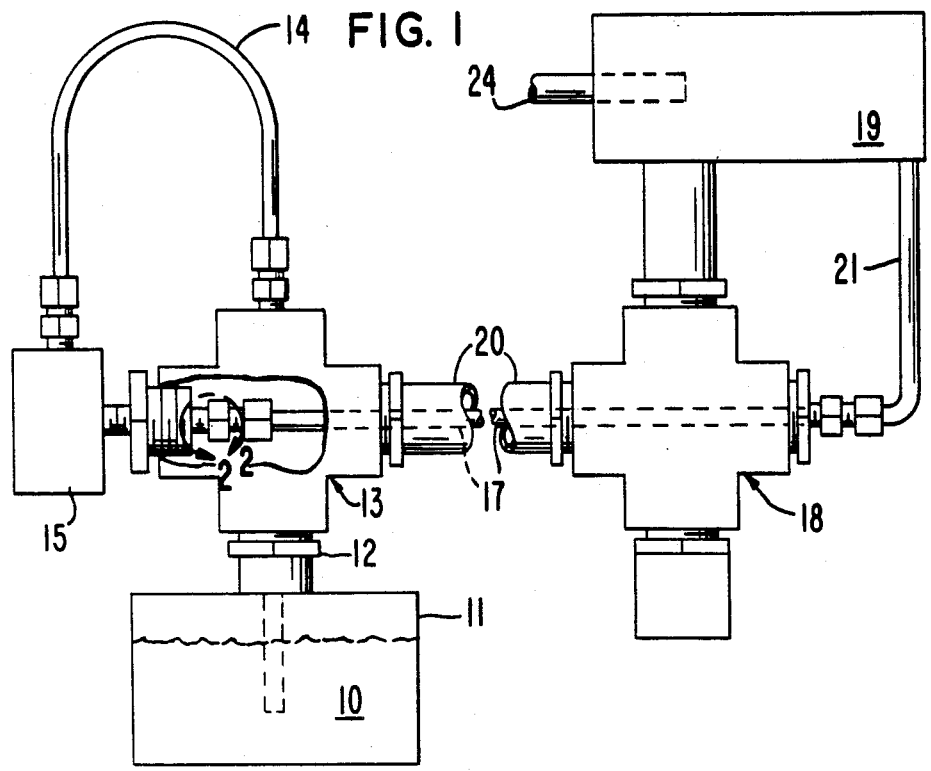
FIG. 1 is a foreshortened schematic elevational view, partially in section, illustrating certain aspects of a fuel system in accordance with the present invention.

Referring now to the drawing, with particular reference to FIG. 1, there is shown a liquid fuel system in accordance with the present invention. An LP-gas fuel tank 11 is provided for storing liquid fuel 10 with liquid and vapor in equilibrium in the tank 11. Liquid fuel flows out through the discharge line 12 and into the upstream pipe tee 13 where it divides into main fuel flow through main fuel line 20 and pilot fuel flow through pilot flow connecting tube 14.

Figure 2:
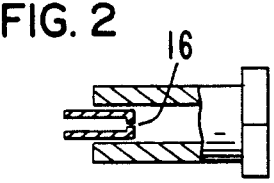
FIG. 2 is an enlarged sectional view of a portion of the structure shown in FIG. 1 delineated by line 2—2.

Pilot fuel flows through the pilot flow connecting tube 14, the fuel lock 15 and is throttled through the orifice 16 (see FIG. 2). The pilot fuel then flows down the pilot fuel line 17 coaxially located within the main fuel line 20 and through the downstream pipe tee 18 and out through a pilot fuel line 21 to a fuel delivery adapter block 19. This adapter block 19 is constructed for positioning on a conventional spark ignition engine where the air stream and fuel is normally inducted into the engine manifold. Pilot fuel flow through the orifice 16 reduces the pressure to a point where the liquid fuel will vaporize. Vaporization takes place as the fuel in the pilot line 17 moves along the length of the main fuel line 20 and heat is transferred from the liquid fuel in the main fuel line into the pilot fuel, all along the run of both lines.

Main fuel flows out of the upstream pipe tee 13, through the main fuel line 20 into the downstream pipe tee 18 and into the fuel delivery adapter block 19. The transfer of heat from the main fuel to the pilot fuel across the wall of the pilot fuel line 17 subcools the main fuel. Heat transfer into the main fuel line 20 from the surroundings may be controlled by proper design of the main fuel conduit.

Since it is important for fuel metering accuracy that the main fuel flow remain totally liquid through the metering valve into the inlet air stream, the design of the liquid fuel maintenance hardware is such as to minimize local turbulence and vortices and their accompanying local pressure drop. Excessive pressure drop in the main line can cause vapor bubbles to form.

Fuel metering is accomplished by introducing a variable flow impedence at the end of the main fuel line farthest from the fuel storage tank and nearest to the engine inlet air stream. The impedence is provided by the incremental valve schematically illustrated as 24 in FIG. 1 and illustrated in greater detail in FIG. 3. In addition to fuel metering, this incremental valve distributes and disperses the main fuel flow.

Figure 4:
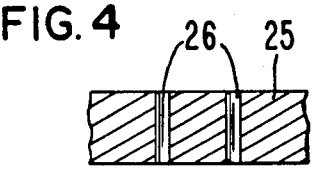
FIG. 4 is an enlarged sectional view of a portion of the structure shown in FIG. 3 delineated by line 4—4.
Figure 3:
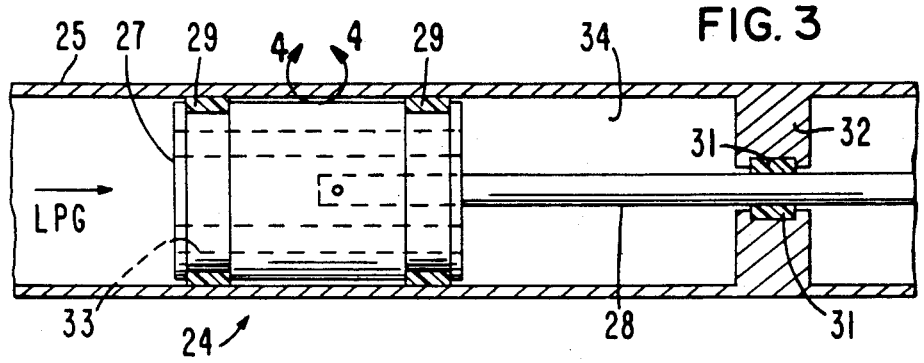
FIG. 3 is a side sectional view of a portion of the structure shown in FIG. 1.

Referring now to FIGS. 3 and 4, the incremental valve 24 consists of a chamber or valve cylinder 25 in the adapter block 19 (FIG. 1) and in the walls of which are drilled a longitudinal series of flow orifices 26 which can be completely covered or progressively uncovered by movement of a piston 27 by applying a force to a piston rod 28 through an actuator mechanism in response to fuel needs.

The piston 27 is provided with a pair of sealing rings 29, and the piston rod 28 is similarly provided with a seal 31 where the rod extends through an apertured end wall 32 of the cylinder. Pressure equalizing ports 33 are provided through the piston 27 to equalize the pressure from the inlet into a rear chamber 34 between the back of the piston 27 and the end wall 32.

The multiple small orifices 26 permit the refrigeration potential of the propane to be realized in lowering the air fuel mixture temperature substantially, hence increasing power and engine performance.

For a fuller understanding of the present invention and its comparison with prior art, Table II details the comparison of gasoline, propane vapor and propane liquid as fuels and shows that the energy volume density for liquid propane is theoretically about 10 percent greater than for propane vapor. For equal thermal efficiencies the power output of a given engine would increase in the same proportion as the energy volumetric density increase.

ENERGY DENSITY COMPARISON[1]
Gasoline and Propane as Fuels
in Internal Combustion Engines

| Parameter | Units | Gasoline | Propane Vapor | Propane Liquid |
|---|---|---|---|---|
| Lower Heating Valve | btu/lb. | 18,900 | 19,800 | 19,800 |
| Stoichiometric air/fuel ratio | lb/lb | 14.5 | 15.7 | 15.7 |
| Stoichiometric Air/fuel mixture energy density | btu/lb air | 1303 | 1261 | 1261 |
| Heat of Vaporization | btu/lb | 150 | 0[2] | 183 |
| Air Specific heat ($C_p$) | btu/lb °F. | | 0.24 | |
| Air cooling effect from fuel vaporization | °F. | 43.1 | 0 | 48.6 |
| Inlet air density | lb/ft$^3$ | .0816 | .0749 | .0825 |
| Air/fuel mixture volumetric energy density | btu/ft$^3$ air | 106.3 | 94.4 | 104.0 |
| Normalized to Propane vapor | | 1.13 | 1.00 | 1.10 |

[1]At standard pressure and temperature.
[2]Since fuel is already vaporized.

Figure 5:
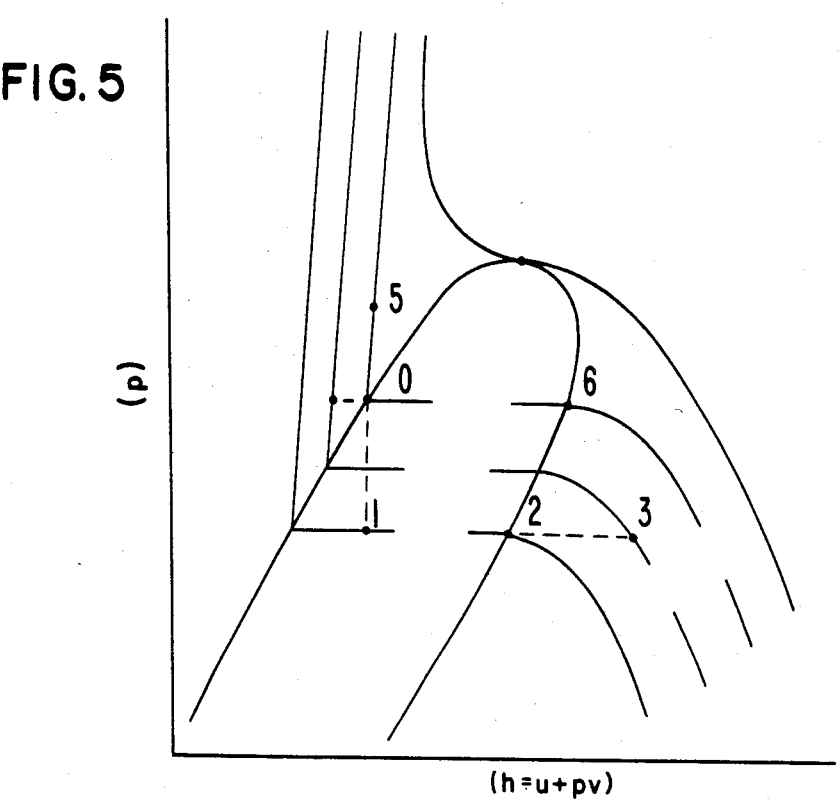
FIG. 5 is a graph of pressure plotted versus enthalpy illustrating certain aspects of the present invention.

FIG. 5 illustrates a typical pressureenthalpy diagram wherein enthalpy "h" is defined in terms of specific internal energy "u," pressure "p" and specific volume "v" as in "Thermofluid Mechanics" by Pefley and Murray, McGraw-Hill Book Co., 1966, p. 155. ($h = u + pv$)

Prior practure to maintain a fluid in liquid phase has been to change its environment by raising pressure or extracting heat by external cooling. Referring to FIG. 5, the starting point for a stored fuel is a mixture of saturated liquid (point 0) and saturated vapor point 6. The fuel tank contains saturated liquid in the lower portion of the tank and saturated vapor in equilibrium at the same pressure and temperature in the upper portion. Note in FIG. 5 that within the saturation region (mixture of liquid and vapor) isothermal and isobaric lines are parallel.

Any liquid withdrawn from the tank leaves as saturated liquid (point 0). As it flows it can experience heating or cooling and a loss of pressure due to fluid friction. Any transfer of heat into the fuel raises the enthalpy (h) and transforms part of the saturated liquid to saturated vapor (point 6). The flowing fuel moves into the saturation region. This means that vapor bubbles are forming in the flowing line and the fuel is a mixture of liquid vapor, increasing in vapor and decreasing in liquid as it moves down the line.

If the flow is adiabatic (no heat transfer) but drops to a lower pressure and the same velocity then the fluid moves from saturated liquid (point 0) into the saturation region at a constant enthalpy and lower pressure (point 1). Again the fuel is a mixture of liquid and vapor, and increasing in vapor.

The present invention uses the refrigerating effect of the vaporizing fuel in pilot fuel flow to extract heat from the main flow and maintain it in the liquid phase by overcoming the effects of pressure drop and heat transfer described above. By throttling, (constant enthalpy expansion to a lower pressure from point 0 to point 1) a lower temperature is generated in the pilot flow. The pilot flow then draws heat from the main fuel flow, subcooling it from point 0 to point 4 in FIG. 4, as the pilot flow continues to vaporize along the path from point 1 to point 2.

For propane the enthalpy change from point 1 to point 2 is in the range of 100 btu/lb. The specific heat of liquid propane is approximately 0.6 btu/lb. °F. Hence, a very small vapor bleed flow will produce a significant reduction in liquid temperature of a larger main fuel flow, and thus assure that the main flow remains liquid up to the point of introduction to the engine.

The theoretical end point of the heat exchange process occurs when both streams come to the same temperature (point 4 for the main flow and point 3 for the pilot flow).

In practice there will be some effect of external heat transfer from the ambient air into the main fuel stream and pressure drop in the main stream which will partially offset the effect of the cooling pilot flow. Design of the device, therefore, balances the magnitude of bleed flow, design of the delivery system and environmental conditions to achieve the most cost effective approach to liquid flow at the metering point. There is no danger of over cooling the main flow as solidification of the propane is not possible.

An added benefit of this pilot flow subcooling is that the pilot flow may be used for idling fuel flow on the engine. Thus, at start-up and during all engine operation, the delivery system is being cooled by the vaporization of the pilot fuel.

Figure 6:
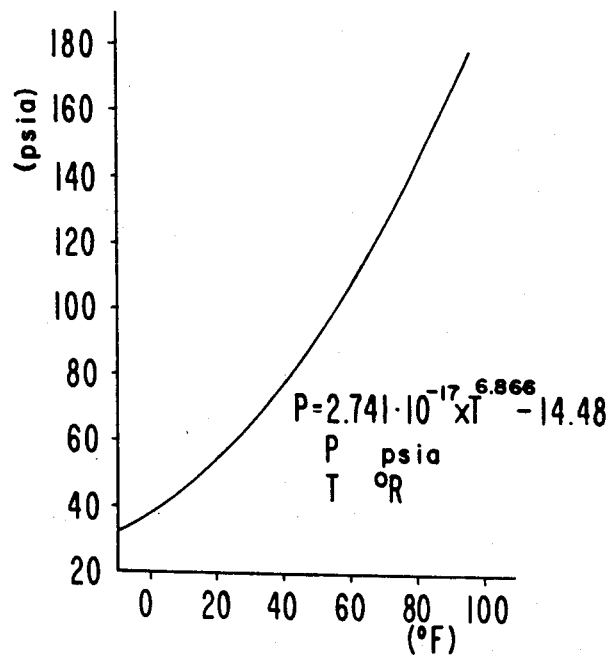
FIG. 6 is a graph of saturated pressure plotted versus temperature illustrating other aspects of the present invention.

In this invention for a liquid fuel delivery system at a given ambient temperature, the pressure within the tank 11 remains constant, and as fuel flows out, more liquid vaporizes restoring the saturation pressure. As ambient temperature varies, the saturation pressure for LPG varies. Saturation pressure for propane, for example, varies according to the curve shown in FIG. 6. The fuel delivery system described here senses the engine fuel requirements and offers a varying impedence to flow at the fuel delivery point such that the fuel tank pressure will induce flow through the system equal to that required.

In this design the dispersion and mixing of the fuel in air is accomplished in the same device as the impedence variation.

These functions are performed by the incremental valve which consists of piston 27 within cylinder 25 which has the longitudinal series of small orifices or ports 26. In its "off" position the piston 27 covers the orifices 26 and no fuel passes through the incremental valve.

As the piston 27 is moved from its closed position, it uncovers progressively more orifices 26, thereby reducing the flow impedence and permits the flow rate of liquid fuel to increase in response to predetermined engine requirements.

Fuel flowing through the holes uncovered by the piston is directed by the orientation of the holes which act as orifices and vaporizes at rates determined by fuel tank pressure, hole size and fuel properties. Very small (0.0005–0.001 in.) holes offer excessive pressure drop. Large holes (larger than 0.006 in.) allow the fuel to pass in large droplets which do not vaporize readily enough. Orifices covering the range of 0.002 to about 0.006 in. are preferred. Since the piston will be moved in finite increments of distance, orifices 26 and spacing must be sized to provide a smooth variation of fuel flow rate, for all tank pressures.

Figure 7:
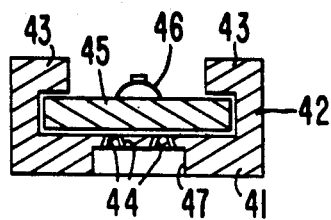
FIG. 7 is an elevational sectional view of an alternative embodiment of the present invention.
Figure 9:
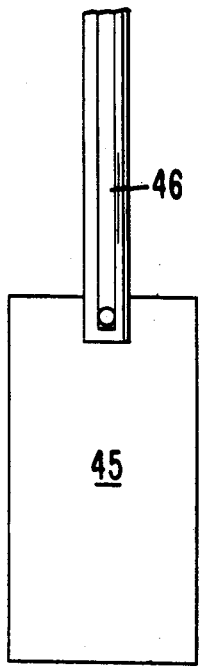
FIG. 9 is an enlarged view of the orifices shown in FIG. 7.
Figure 8:
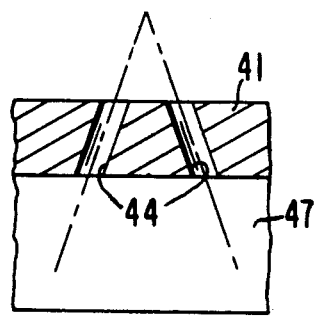
FIG. 8 is an exploded plan view of the structure shown in FIG. 7.
Figure 8:
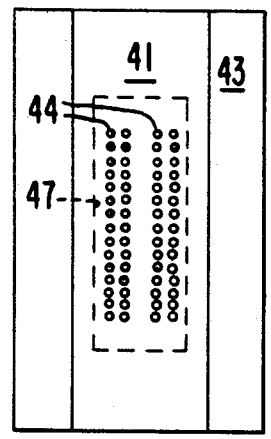

An alternative metering valve system and improvements is illustrated in FIGS. 7–9. As shown there the metering valve consists of a flat orifice plate 41 with side tab retaining arms 42 and upper flanges 43 with the metering orifices 44 laser drilled through the plate 41. A slide metering tab 45 positioned by an actuator rod 46 is utilized to cover and uncover a predetermined number of fuel metering orifices 44. The metering tab 45 is contained between the tab retaining arms 42 and the flanges 43 to provide a mechanical alignment and preload sealing forces between the tab 45 and the plate 41. The underside of the orifice plate 41 has a milled out region 47 in the vicinity of the orifices 44 so that a wall thickness of about 0.010 inch exists through which the orifices 44 extend. This thin wall section has been found to produce reliable fuel flow for the very small orifice diameters used.

As best illustrated in FIG. 9 the orifices 44 have their axes in adjacent rows positioned non-parallel for impingement of the fuel streams therefrom to provide better fuel atomization in a very short distance into the air stream for thorough mixing of fuel and air.

We claim:

1. A liquid fuel system for an engine comprising:
   a fuel tank means for storing saturated fuel under pressure with liquid and vapor in equilibrium,
   a fuel delivery adaptor means for securing in place along the inlet airstream of an engine including:
   a fuel delivery chamber in said adapter means,
   a flat plate having a series of liquid phase fuel orifices connecting said delivery chamber to the inlet airstream of the engine,
   a slide metering tab slidable relative to said delivery chamber across said orifices in said plate for progressively uncovering said series of orifices, and
   actuator means for moving said tab to cover or uncover said flow orifices for passage of fuel therethrough in response to engine fuel needs,
   a fuel line means for carrying fuel in the liquid phase from the fuel tank means to said fuel delivery means for direct injection of fuel in the liquid phase into the inlet airstream of the engine, and
   means for vaporizing a small portion of fuel to cool the liquid fuel in said fuel line insuring direct injection of the main fuel supply in the liquid phase.

2. A liquid fuel system for an engine comprising:
   a fuel tank means for storing saturated fuel under pressure with liquid and vapor in equilibrium,
   a fuel delivery adaptor means for securing in place along the inlet airstream of an engine including:
   a fuel delivery chamber in said adapter means,
   a flat plate having a series of liquid phase fuel orifices connecting said delivery chamber to the inlet airstream of the engine,
   at least certain of said orifices having axes which are non-parallel with the axis of other of said orifices for impingement of the fuel streams thereof,
   a slide metering tab slidable relative to said delivery chamber across said orifices in said plate for progressively uncovering said series of orifices,
   actuator means for moving said tab to cover or uncover said flow orifices for passage of fuel therethrough in response to engine fuel needs,
   a fuel line means for carrying fuel in the liquid phase from the fuel tank means to said fuel delivery means for direct injection of fuel in the liquid phase into the inlet airstream of the engine, and means for vaporizing a small portion of fuel to cool the liquid fuel in said fuel line and insuring direct injection of liquid fuel.

3. In a liquid fuel system for an engine for carrying liquid from a fuel tank to delivery into the inlet airstream of the engine, the improvement comprising:

a fuel delivery adaptor for securing in place along the inlet airstream of an engine and having a fuel delivery chamber and a series of liquid phase orifices connecting said delivery chamber to the inlet airstream of the engine, said orifices having diameters in the range of 0.002 to 0.006 inch, at least certain of said orifices having axes which are non-parallel with the axis of other of said orifices for impingement of fuel streams thereof, means slidable relative to said delivery chamber across said orifices for progressively uncovering said series of orifices, and actuator means for moving said slidable means to cover or uncover said flow orifices for passage of fuel therethrough in response to engine fuel needs.

* * * * *